United States Patent [19]

Feldon

[11] 4,065,760

[45] Dec. 27, 1977

[54] LIQUID LEVEL SENSOR

[75] Inventor: Arthur Feldon, Van Nuys, Calif.

[73] Assignee: fea Devices, Inc., Van Nuys, Calif.

[21] Appl. No.: 774,621

[22] Filed: Mar. 4, 1977

[51] Int. Cl.² ............................................. G08B 21/00
[52] U.S. Cl. ............................ 340/244 R; 338/22 SD; 338/28; 338/30
[58] Field of Search .................... 340/244 R, 244 C; 73/295; 338/28, 22, 30, 25

[56] References Cited

U.S. PATENT DOCUMENTS

| | | | |
|---|---|---|---|
| 2,271,975 | 2/1942 | Hall | 338/30 |
| 2,818,482 | 12/1957 | Bennett | 338/30 |
| 3,645,785 | 2/1972 | Hentzschel | 338/22 SD |
| 3,792,456 | 2/1974 | Hill | 340/244 R |
| 3,846,747 | 11/1974 | Arai et al. | 340/244 R X |
| 3,863,210 | 1/1975 | Roland et al. | 340/244 R X |
| 3,872,419 | 3/1975 | Groves et al. | 338/22 X |
| 3,896,424 | 7/1975 | Peltz et al. | 340/244 R |
| 3,918,018 | 11/1975 | Tuley et al. | 338/28 |
| 3,922,658 | 11/1975 | Harper et al. | 340/244 R |
| 3,932,852 | 1/1976 | Hill | 340/244 R |

Primary Examiner—John W. Caldwell, Sr.
Assistant Examiner—Daniel Myer
Attorney, Agent, or Firm—Spensley, Horn & Lubitz

[57] ABSTRACT

A device for detecting both low level and excessively high temperature of oil in an internal combustion engine or other oil container. The device consists of a semiconductive material which exhibits a peak electrical resistivity at a predetermined temperature. The semiconductive material is mounted on the interior bottom surface at the closed end of a metal cup which is suitably mounted and immersed in the fluid whose level and temperature are to be monitored. The semiconductive material is connected in series with a power supply and indicator light. If, at any point over a broad range of temperatures, such as −50° F to +300° F, the level of the liquid drops such that it does not contact the cup sufficiently the normal current flowing in the circuit will heat the semiconductive material past its peak resistivity thereby driving the current in the circuit past the level required to light the bulb and indicate a problem (herein a problem of low level). If the level of the oil is adequate, the normal current in the circuit will not raise the temperature of the semiconductive material above the temperature of peak resistivity. Should the temperature of the oil exceed the temperature of peak resistivity, the current will increase to the point where the light will glow indicating excessive oil temperature.

12 Claims, 3 Drawing Figures

LIQUID LEVEL SENSOR

BACKGROUND OF THE INVENTION

1. Field of the Invention

This invention relates to means for sensing liquid level and temperature and more specifically to an oil level and temperature sensor utilizing semiconductive material having a peak resistivity at a predetermined temperature.

2. Description of the Prior Art

It is frequently desirable to provide a device for automatically sensing the presence of a sufficient quantity of liquid in a container where the liquid may or may not be subject to heating.

The conventional thermal sensing circuits which exist in the prior art measure the change in thermal temperature of the liquid in the container. They will only respond, therefore, when evaporation occurs due to excessive heating of the liquid, while failing to respond to a drop in the liquid level that was not caused by excessive heating, such as a leak in the liquid container.

The thermal sensing circuit of Prussin, disclosed in U.S. Letters Pat. No. 3,412,610, overcomes partially the aforementioned problem. The Prussin device takes advantage of the fact that a liquid such as water is a far more effective coolant than air and if the thermal sensor in the circuit is subject to self-joule heating, its temperature will rise in the absence of the liquid coolant. Thus if the resistivity of the Prussin semi-conductive thermal sensor is such that it peaks at a given predetermined temperature, and if the temperature of the sensor exceeds the predetermined temperature at which peak resistivity occurs due to self-heating caused by the absence of liquid coolant, a runaway current results in the circuit due to the precipitous drop in resistivity of the sensor above the predetermined temperature, which in turn leads to more joule heating and a further drop in the resistivity. In short, a thermal and current avalanche is induced.

Particular problems are created however, if, first of all, the liquid, the level of which is to be sensed, is not a far more effective coolant than is air. If this is the case, it is evident that thermal and current avalanche may occur due to self-joule heating, regardless of whether the sensor is in contact with the liquid or not. Oil, for instance, is such a liquid. Secondly, if under normal operating conditions, the temperature of the liquid varies over a wide temperature range, then the liquid level sensor must be able to respond to a drop in liquid level which occurs at any point over this entire wide temperature range. The oil temperature in an internal combustion engine, for instance, normally varies over a temperature range from −50° F to 300° F (or −45° C to 150° C). Thus, an effective oil level sensor must be able to sense a drop in the oil level over this entire temperature range.

As noted above, peculiar problems and phenomena occur when the device of the Prussin patent is attempted to be used to monitor the level and temperature of a fluid which is not a good conductor of heat. Some of those problems will now be discussed in detail.

The primary problem is the inability of the fluid to conduct heat, which results in a build up of heat in the fluid immediately surrounding the sensor. This problem is particularly severe if the fluid is not circulating, as is the case when an automobile is parked. To illustrate this problem, consider the device of Prussin as it would operate with a fluid such as water, compared to a fluid such as oil. When the device of Prussin operates with water, the self-joule heating is readily absorbed by the water since water is a good thermal conductor, even if the water is non-circulating. The Prussin device may even work in hot non-circulating water. If the water is very hot and non-circulating, the self-joule heating of the Prussin device may cause the water in contact with the diaphragm, in the immediate vicinity of the semiconductor material, to boil. The low viscosity of water would permit the bubbles of gas produced by boiling to rapidly float away from the vicinity of the semiconductor, causing new water to be brought into contact with the hot surface of the diaphragm thereby cooling the device. The low viscosity and high thermal conductivity of the water combine and effectively cool the Prussin device even when the water is very hot and local boiling occurs near the sensor as a result of self-joule heating. It is to be noted that this is so, even though the semiconductor material of the prussin device is mounted on a diaphragm having a high thermal conductivity between the semiconductor material and the liquid and a low almost insulative thermal conductivity in the direction of the plane of the diaphragm. Thus, even though the Prussin device is somewhat thermally isolated upon the diaphragm, thereby permitting a local heat build-up due to joule-heating, the presence of even very hot non-circulating water is sufficient to cool the semiconductor material so that it does not reach a temperature corresponding to its peak resistivity. The above described operation of the Prussin device in water, or in radiator coolant, will now be contrasted with the manner in which it would perform in a liquid of greater viscosity and lower thermal conductivity, such as oil.

Consider first the operation of the device of the Prussin patent is immersed in cool oil. If the cool oil is sufficiently circulating, there will be little heat build-up in the vicinity of the semiconductor device, as the temperature difference between the oil and semiconductor device is sufficient to insure adequate cooling of the semiconductor. If the cool oil is non-circulating, as when the automobile is parked overnight, problems occur and prevent proper operation of the Prussin device. Since the cool oil is very viscous and a poor conductor of heat, the heat produced by joule-heating of the semiconductor device is not removed from the immediate vicinity of the semiconductor material. This heat builds up to the point where the viscous fluid may even begin to boil in the immediate area of the semiconductor material. Because the surrounding fluid is cool and viscous, the gases produced by the local boiling are trapped and further insulate the semiconductor material from the cooler oil. This heat build-up will continue to the point where the semiconductor material reaches its maximum resistivity and eventually triggers the trouble indicator (warning light, meter, etc.). This condition is further aggravated in the device of Prussin because that device is placed on a thin diaphragm the purpose and construction of which is to thermally insulate the semiconductor device from the walls of the container of fluid, the effect of which is to trap the heat build-up in the vicinity of the semiconductor material. The device of Prussin thus will not properly function in a non-circulating cool viscous liquid.

Consider second the operation of the device of the Prussin patent is immersed in heated oil. Based upon the discussion of the cool non-circulating oil it should be self evident that the Prussin device could not properly function in heated oil (or other viscous liquid). The temperature difference between the semiconductor material and heated oil is less than the temperature difference between the semiconductor material and cool oil, resulting in a net loss of cooling efficiency, even though the viscosity of the heated oil is less than the viscosity of the cool oil. Since the cooling efficiency of the heated oil is less than the cooling efficiency of the cool oil, the Prussin device cannot operate better than as in the cool non-circulating oil. Since it has been shown that the Prussin device will not operate properly in cool uncirculating oil, it will not operate it heated uncirculating oil.

The final environment to be examined for evaluation of the operation of the Prussin device is hot circulating oil (or other viscous fluid). Although the oil is relatively hot and therefore less viscous than cool oil, its cooling efficiency is still nearly as low as non-circulating hot oil due to the fact that all the circulating oil is uniformly hot. Even though the oil is circulating, a thin layer of hot oil tends to adhere to the surface of the diaphragm and this thin layer has a very low velocity. This low cooling efficiency of the hot circulating oil combines with another feature of the Prussin device, namely the thin diaphragm which tends to insulate the semiconductor material from the wall of the liquid container but not from the liquid, to permit a build-up of heat in the thin layer of relative static hot oil adhering to the diaphragm. The heat build-up is not dissipated to the container walls and continues to build up to the point where either (1) the thin layer of adhering oil begins to boil, further insulating the semiconductor material from any cooling effects of the circulating hot oil, thus causing the semiconductor material to indicate overheated oil when in fact the oil is not overheated or (2) even if the thin layer of oil does not begin to boil, the oil is unable to cool the semiconductor sufficiently to prevent it from reaching its peak resistivity. The self-joule heating of the Prussin device, when used in a hot and viscous fluid, is too high to permit proper operation of that device. The preceeding discussion has to be qualified somewhat to allow for the fact that if the velocity of oil is sufficiently high, the Prussin device might operate satisfactorily, depending on the velocity of oil, but would not operate satisfactorily over a broad velocity range. The operation of the Prussin device is highly dependent on the velocity of circulating hot oil. The identification of the nature of the problem was only the first step in effecting a solution. Basically, the problem with the Prussin device is that it relies exclusively upon the fluid to dissipate the self-joule heat generated by the semiconductor material. This is made manifest at column 4 line 73 to column 5 line 3, where it is stated that "the temperature of the senor is substantially unaffected by that of the wall of the container".

It is thus an object of the present invention to construct a device for sensing the presence or absence of fluid at a given level in a container and sensing whether that fluid is above or below a predetermined temperature which device is functional in fluids of low viscosity and high thermal conductivity such as water and relatively high viscosity and low thermal conductivty such as motor oil.

It is a further objective of the present invention to provide an oil level sensor which operates in a thermal circuit with a 12-v. battery and with a small light bulb as the only load and current limiting device.

SUMMARY OF THE INVENTION

The present invention consists of a unique combination of carefully sized elements which form a device which detects and indicates excessive oil temperature and the lack of a sufficient quantity of oil (or other viscous fluid) within a container.

Once the nature of the problem, discussed in the previous section, was understood it became evident that the solution, whatever its final form, would include some means for more effective cooling of the semiconductor device at high fluid temperatures. The device of Prussin teaches that the semiconductor device should be somewhat thermally insulated from the walls of the fluid container, so that the temperature of the semiconductor device is substantially not affected by the temperature of the walls. It is worth noting that the device of the present invention is in direct conflict with this teaching of Prussin. The present invention employs a layer of gold, on both the inside and outside surfaces of the container upon which the semiconductor device is mounted, for the very purpose of reducing the thermal resistance of the path from the semiconductor to the wall. Because of this layer of gold, the walls of the oil container serve as a heat sink for the semiconductor device. Although the viscous fluid (oil) could not adequately cool the semiconductor device by itself, when used in combination with the cooling effect of the container walls the total cooling effect is sufficient to keep the temperature of the semiconductor device below the predetermined reference temperature. A novel feature of the present invention is that every element of the total package, upon which the semiconductor is mounted, is carefully designed and sized to achieve the critical cooling required in hot oil when the oil temperature is near the predetermined temperature reference.

Because the design of the present invention involves an integrated total package design, the thermal conductivity of each package element becomes of critical concern. For instance, if the length of the gold covered Kovar cup is changed then the thickness of the gold layer must also be adjusted to compensate for the length change. The thickness of the layer of aluminum does not appreciably affect the operation of the device in cool oil, but is critical for cooling purposes in heated oil. The present invention takes advantage of the thermal properties of the entire package in order to cool the semiconductor device so as to keep its temperature only slightly above (about 3° to 9° C) the temperature of the liquid in which it is immersed, even when the liquid is relatively hot and viscous and a poor thermal conductor.

The cooling properties of the entire package have been carefully designed so that the device is still operable to indicate a lowering of liquid level if the liquid is cool. If the cooling effect of the package on the semiconductor is too great, then a drop in level of cool liquid will not be detected as the package will have cooled the semiconductor device and maintained it below the peak resistivity even in absence of liquid. Conversely, if the cooling effect of the total package is not great enough, the semiconductor device will produce self heating, in heated oil, which cannot be absorbed away from the semiconductor device and consequently will build up causing the device to reach its maximum resistivity and indicate trouble even though the oil is cool and in contact with the sensor device.

The present invention has been sized to operate with a 12v. D.C. power source, which may in fact produce an actual voltage of from 11 to 14 or 16 volts, and a light bulb indicator of approximately 5 watts. The indicator light will not glow unless a certain minimum current flows (e.g. 100 m.a.). The power supply, indicator light and sensor device are all connected in series. The device is sized such that the current which flows under normal operational temperatures and minimum adequate fluid supply is less than required to light the bulb. However, if the fluid level falls below a predetermined quantity or the temperature exceeds a predetermined level, the light glows.

The sensor device of the present invention comprises a layered metal cup having a core of a material well known and commercially available under the name of Kovar. Kovar is an alloy of iron, nickel and cobalt. The Kovar cup has a closed end and an open end which has a lip or flange. Both the inside and outside surfaces of the cup are coated with gold. Attached to the interior bottom surface of the cup is a semiconductive material which has the characteristic of exhibiting a peak ohmic resistivity at a temperature which is predetermined by the degree of doping of the semiconductor material. The semiconductive material has an upper and a lower surface, both of which are coated with a layer of aluminum. On the layer of aluminum is placed a layer of nickel.

This coated semiconductive material is appropriately electrically attached or fastened to the bottom interior surface of the cup.

The end and its internally mounted semiconductive material are mounted on an externally threaded bolt which is inserted into an internally threaded hole in the wall of the oil container (e.g. engine block), such that the cup is bathed in the circulating engine oil. To protect the delicate cup during insertion, a shield is attached to the threaded bolt and extends around and beyond the cup, and is so shaped as to not interfere with the free flow of oil around the cup.

An electrical conductor extends through a hole in the threaded bolt, located along the axis of the bolt. The conductor extends through the bolt and into the cup. The conductor terminates inside the cup in an S shaped spring contact which makes electrical contact with the layer of nickel above the semiconductive material.

The above described device is placed in an electrical circuit whose path typically would be as follows.

The negative terminal of the power supply is connected through a lead wire to the engine block which is in physical and electrical contact with the bolt. The bolt is in physical and electrical contact with the layer of gold on the flange of the cup. The layer of gold is connected through the layer of solder, nickel and aluminum to the semiconductive material. The semiconductive material is connected through the upper layers of aluminum and nickel, through the S shaped spring contact to the sensor output terminal. The sensor output terminal is connected through a lead wire through the indicator light through another lead wire to the positive power supply terminal thereby completing the circuit.

The objectives of the present invention are accomplished with the unique combination of a sensor with a carefully chosen thermal inertia connected serially with a 12 v battery and a 5 watt light bulb. The thermal inertia of the sensor must be so chosen that (1) in the absence of fluid if subjected to joule heating of approximately one to one and one-half watt, it will almost instantaneously be driven to a temperature exceeding the predetermined temperature of approximately 150° C to 165° C if the initial temperature of the sensor lies between −45° C to 150° C and that (2) if the sensor is immersed in oil, the temperature of the sensor will remain below said predetermined temperature as long as the temperature of the oil is below a predetermined level. The sensor is composed of a semiconductive material having a peak resistivity between 100 and 200 ohm-cm, said peak resistivity occurring at a predetermind temperature between 150° C and 165° C. The semiconductive material is soldered onto the inside of the closed end of a cylindrical cup as more fully described later in this specification.

DESCRIPTION OF THE PREFERRED EMBODIMENT

Figure 1:
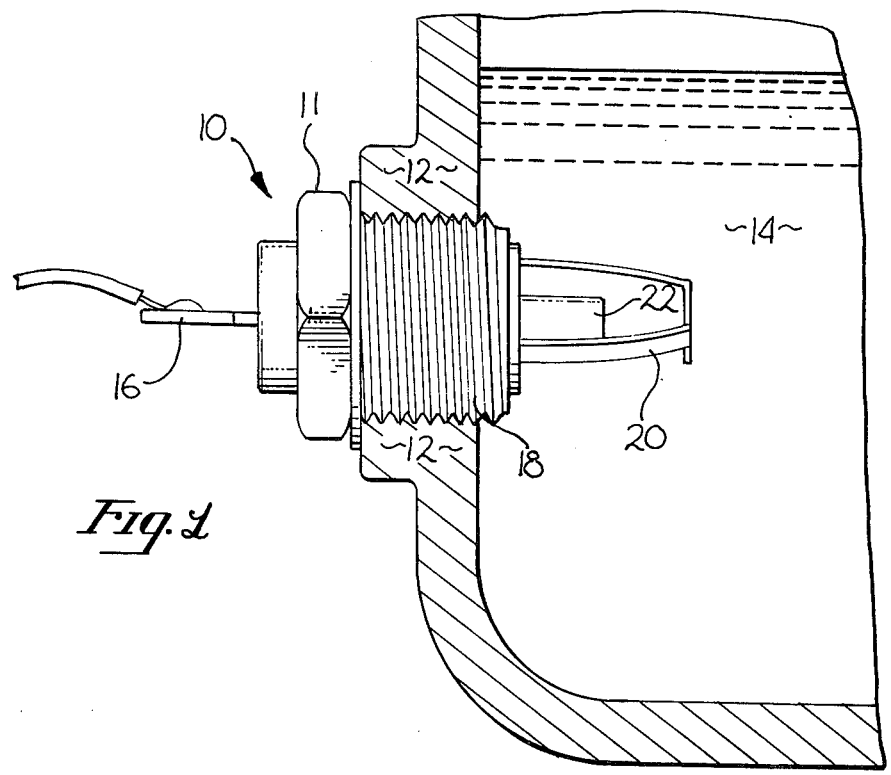
FIG. 1 is a sectional view of an oil container showing the oil level sensor installed in the wall of that container.

The oil temperature and level sensing device of the preferred embodiment is designated generally as element 10 as shown in FIG. 1. The body of the sensing device consists of an externally threaded bolt 11 which is threadedly mounted in container wall 12 so as to extend through the wall and contact the oil 14 within the container. The height at which the sensing device 10 is mounted in the container wall 12 is the level above which it is desired to maintain the oil. When the oil 14 falls below the level of sensing device 10 the invention gives its warning. The sensing device 10 has an output terminal 16 and has external threads 18 which mount the bolt 11 securely within container wall 12. A shield 20 protects the delicate cup 22 at all times, and most importantly during installation of the sensing device 10.

Figure 2:
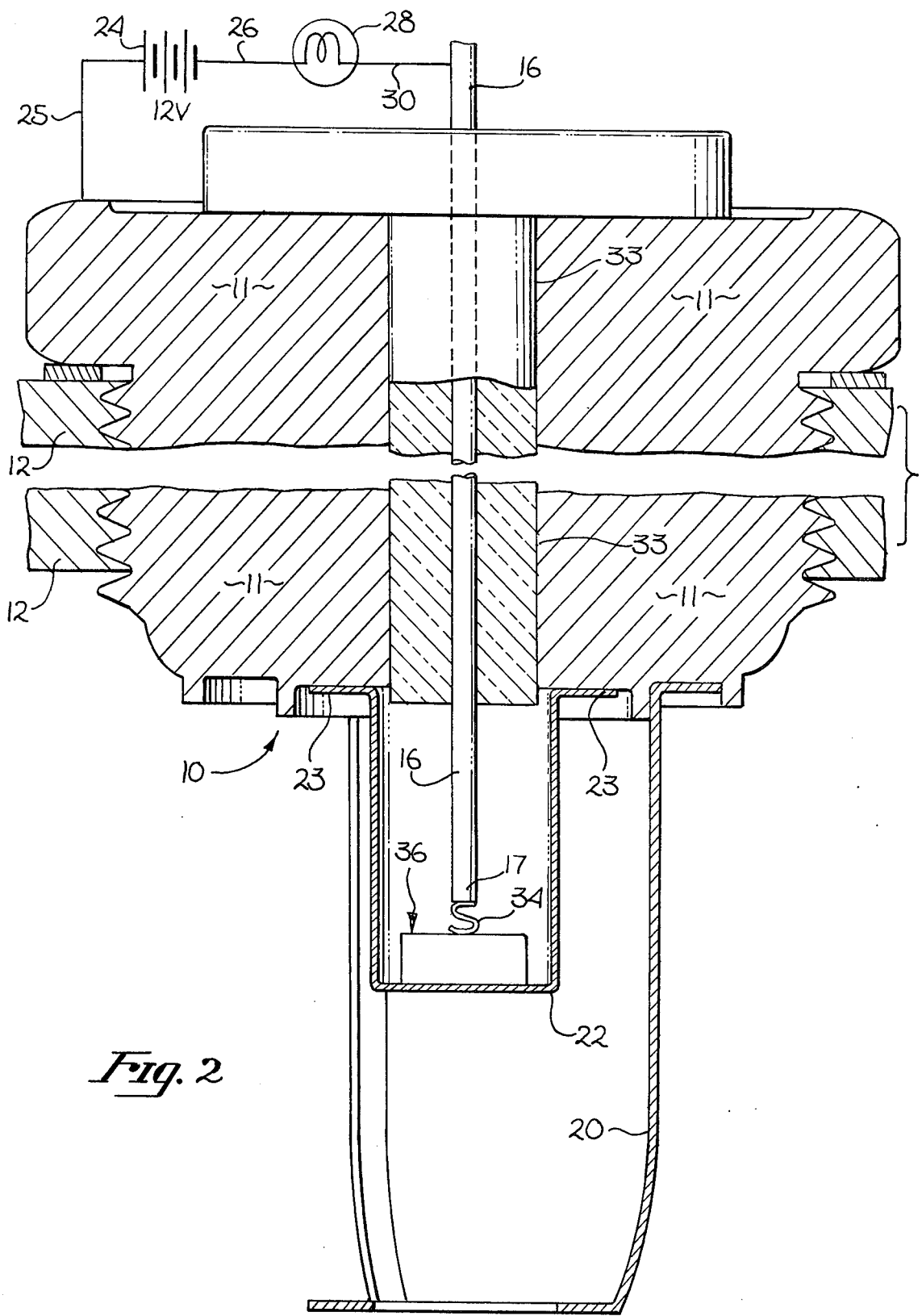
FIG. 2 is a combination sectional view of the sensor of the present invention and a circuit diagram showing the electrical connections between the various elements of the present invention.

The actual operation of the sensing device is most easily explained with reference to FIG. 2. The preferred embodiment utilizes a 12 volt D.C. power supply 24, the positive terminal of which is connected by lead wire 26 to one terminal of indicator light 28. The other terminal of indicator light 28 is connected by lead wire 30 to the output terminal 16. Output terminal 16 is electrically insulated from the threaded bolt 11 by means of appropriate insulative material 32 which encases output terminal 16 along at least that portion of its length which is within the axial hole 33 of the threaded bolt 11. At one end 17 of output terminal 16 is attached an S shaped spring contact 34. This spring contact is attached at point 35 by suitable means, e.g. solder or welding. The S shaped spring contact serves to insure electrical connection between point 35 of the output terminal 16 and point 37 of the semiconductive sensing element 36.

Semiconductive sensing element 36 is in physical and electrical connection with cup 22. Cup 22 serves to connect semiconductive sensing element 36 with the other terminal of the power supply 24 via threaded bolt 11, the container wall 12 and lead wire 25, thereby completing the electrical circuit. Indicator light 28 also serves to limit the current in the circuit below the level which would physically harm the sensing device 10.

Figure 3:
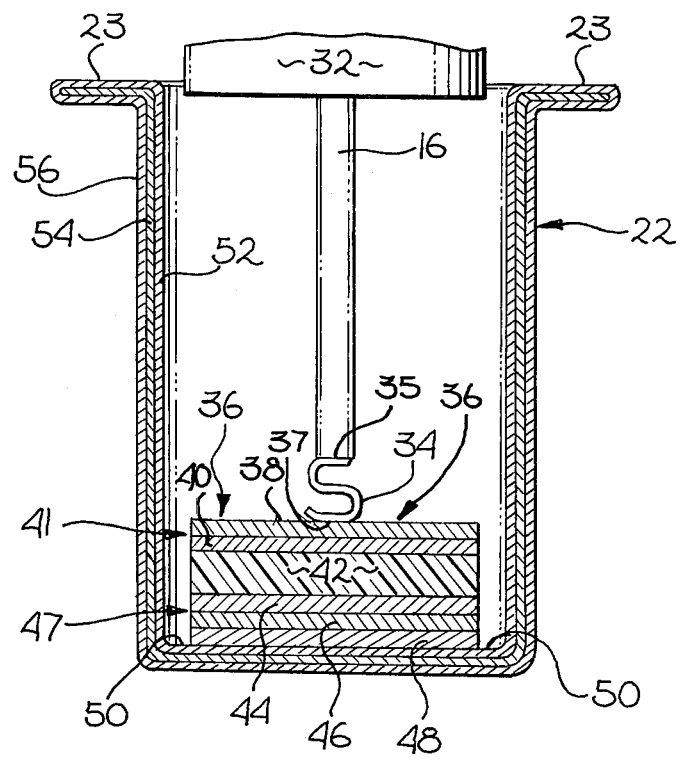
FIG. 3 is a detailed cross sectional view of the cup and the attached semiconductor material which forms the sensor of the present invention.

The semiconductive sensing element 36 and the cup 22 are more clearly shown in FIG. 3. Integrally formed from the sides of cup 22 is a flange 23 which serves to insure good electrical conductivity between the cup 22 and threaded bolt 11. Semiconductive sensing element 36 is comprised of many layers, each of which will be described in detail.

Layer 38 is the uppermost layer of nickel and is approximately 1 micron in thickness. Immediately beneath layer 38 is the upper layer of aluminum 40, which is from 6 to 12 microns thick. Layers 38 and 40 together form a first conductive means 41. Beneath layer 40 is the semiconductive material 42. In the preferred embodiment 42 is made of silicon and is less than 0.01 inch thick. The silicon is doped with P type impurities such that its resistivity peaks at from 100 to 200 ohm-cm. resulting in a peak resistivity being reached at a temperature of about 150° C. A convenient shape for this application of the semiconductive material is a disk shaped chip.

On the lower surface of semiconductive material 42 is applied a lower layer of aluminum 44 of the same thickness (6 to 12 microns) as the upper layer of aluminum 40. Beneath the layer 44 is deposited a layer of nickel 46, which is the same thickness (1 micron) as the upper nickel layer 38. Layers 38, 40, 42, 44 and 46 comprise the semiconductive sensing element 36, which is attached by means of solder 48 to the interior bottom surface 50 of cup 22. The solder 38 is enriched with gold and germanium, is approximately 0.001 inch thick, and serves as an electrical conductor between the semiconductive sensing element 36 and cup 22. Layers 44 and 46 together form the second conductive means 47.

Cup 22 has an open end which is provided with a flange 23. The cup comprises a cup shaped core of Kovar 54 which is coated on both its interior and exterior with gold. The interior layer is labeled 52 and the exterior layer is labeled 56 in FIG. 3. The Kovar 54 is an alloy of iron, nickel and cobalt and in the preferred embodiment this core of Kovar is less than 0.0015 inch thick, with the inner and outer layers of gold (52 and 56) being approximately 1.5 micron thick (about 60 microinches).

If the above described sensing device is to operate properly over the wide temperature operating range of the oil of an internal combustion engine (−50° F to 300° F) the device must meet a number of criteria.

The device must have a very low thermal inertia, i.e. it must readily conduct heat from the oil 14 to the semiconductor material 42. To meet this criteria the cup 22 is very thin as disclosed above or constructed of materials with a high thermal conductivity, e.g. thin Kovar and high conductivity gold. Kovar is also used because its thermal coefficient nearly matches that of the semiconductive material. The layers of aluminum (40 and 44) and nickel (38 and 46) are also kept thin as is the layer of solder (0.001 inch) which has gold in it for increased conductivity. Even the semiconductor material 42 is quite thin (0.01 inch). Because of the careful sizing and choice of materials illustrated above, heat from the oil 14 flowing around cup 22 is readily transferred to the semiconductor material 42, causing a rapid change in the resistivity of that material in response to a change in temperature of oil 14.

The sizing and choice of materials is critical because oil is not an efficient coolant and yet the device of the present invention must be cooled by the mere presence of oil such that the current which normally flows through the circuit does not heat the semiconductor material above the temperature of peak resistivity and the same design of the present invention must be sized so that in the absence of oil cooling cup 22 the same normal current will rapidly heat the semiconductor material above the temperature of maximum resistivity, even though the ambient temperature may be about −50° F.

The small size and high conductivity of the structure of the present invention is also important to insure even heating of the semiconductor material such that no local hot spots develop and produce a runaway current which would light the indicator light 28.

The operation of the present invention as described above can be illustrated with reference to two environmental states.

The first state is one where the oil level is low, too low to contact cup 22. In this state the indicator light must turn on whether the air surrounding cup 22 is at −50° F or 300° F or any point in between. This means that the circuit comprising the power supply, indicator light and sensing device must be sized to provide a current which, under the conditions of this first state, will cause the semiconductive material 42 to heat up to a temperature beyond which its maximum resistivity occurs. This will cause the device to further become heated, causing an additional drop in resistivity which therefore increases the current flow in the circuit and further raises the temperature of the semiconductive material. This runaway condition quickly causes the current to reach a level sufficient to cause the indicator light to turn on. This result must occur whether the ambient air temperature is −50° F or 300° F.

The second state is one where the oil level is above the level of cup 22 such that cup 22, and hence semiconductor material 42, is cooled by the presence of the oil. In this state the indicator light 28, power supply 24, and sensing device 10, must be sized such that the current in the circuit will not cause the indicator light to turn on unless the temperature of the oil has passed the temperature of maximum resistivity of the semiconductor material and reached the preselected temperature at which it is desired that the warning be given.

The sizing and construction of the various elements disclosed herein is such that all the above criteria are met and the device operates properly in both states discussed above.

While the invention has been particularly shown and described with reference to a preferred embodiment thereof, it will be understood by those skilled in the art that various changes in form and details therein may be made without departing from the spirit and scope of the invention.

What is claimed is:

1. An oil level sensor comprising:
   a body of semiconductive material having a peak electrical resistivity of between 100 ohm-cm and 200 ohm-cm, said peak resistivity occurring at a temperature between 150° centigrade and 165° centigrade;
   a cylindrical cup open at one end, constructed of a metal alloy having a thermal coefficient of conductivity which closely matches that of the semiconductive material said cup being coated on both the inside and outside with a layer of gold;

said body of semiconductor material having a thickness of less than ten one-thousandths of an inch, and a cross sectional area of between 0.015 and 0.035 square inches;

a first conducting means, disposed upon the upper surface of said body of semiconductive material, comprising a first layer of nickel approximately 1 micron thick and a second layer of aluminum of between 6 and 12 microns thick, said first layer of nickel being joined to the upper surface of the second layer of aluminum which is joined to the upper surface of said body of semiconductive material;

a second conducting means, disposed upon the lower surface of said body of semiconductive material, comprising a first layer of nickel approximately 1 micron thick and a second layer of aluminum of between 6 and 12 microns thick, said first layer of nickel being joined to the lower surface of the second layer of aluminum which is joined to the lower surface of said body of semiconductive material;

said first layer of nickel of said second conducting means being joined to the layer of gold on the interior bottom surface of said cup by a solder means less than two-thousandths of an inch thick.

2. The oil sensor of claim 1 wherein the cup is made of the metal alloy Kovar.

3. The oil level sensor of claim 2 wherein the solder means is enriched with gold and germanium.

4. The oil level sensor of claim 3 wherein the layers of gold are approximately 1 micron in thickness, and the Kovar is about 0.0015 inch thick.

5. An oil level sensing apparatus for determining that the level of oil in an internal combustion engine is above or below a predetermined level comprising:

a mounting member securely mountable within an opening, defined by a wall of the internal combustion engine, at the level above which it is desired to maintain said oil within said internal combustion engine;

an electrically conductive output terminal member, insulatively mounted within a hole extending axially through said mounting member, said output terminal extending beyond both surfaces of the wall of said internal combustion engine and terminating with a spring type contact on that end which extends internally to the internal combustion engine;

a body of semiconductor material having a peak electrical resistivity of between 100 ohm-cm and 200 ohm-cm, said peak resistivity occurring at a temperature between 150° centigrade and 164° centigrade;

a cylindrical cup having a flange at its open end, constructed of a metal alloy having a thermal coefficient of conductivity closely matching that of the semiconductive material said cup being coated on both its inside and outside surface with a layer of gold;

said body of semiconductor material having a thickness of less than en one-thousandths of an inch, and a cross section area of between 0.015 and 0.035 square inches;

a first conducting means, disposed upon the upper surface of said body of semiconductive material, comprising a first layer of nickel approximately 1 micron thick and a second layer of aluminum of between 6 and 12 microns thick, said first layer of nickel being joined to the upper surface of the second layer of aluminum which is joined to the upper surface of said body of semiconductive material;

a second conducting means, disposed upon the lower surface of said body of semiconductive material, comprising a first layer of nickel approximately 1 micron thick and a second layer of aluminum of 6 to 12 microns thick, said first layer of nickel being joined to the lower surface of the second layer of aluminum which is joined to the lower surface of said body of semiconductive material;

said first layer of nickel of said second conducting means being joined to the layer of gold on the interior bottom surface of said cup by a solder means less than two thousandths of an inch thick;

said cup and its attached semiconductor material being mounted upon said mounting member so as to completely enclose that end of said output terminal which terminates with the spring contact and cause said spring contact to make electrical connection with the first layer of nickel of said first conducting means;

a shield member mounted upon said mounting member and surrounding said cup so as to protect the cup from impact, said shield being so constructed as to permit the free flow of oil around said cup.

6. The oil level sensing apparatus of claim 5 wherein the cup is made of the alloy Kovar.

7. The oil level sensing apparatus of claim 6 wherein the soler means is enriched with gold and germanium.

8. The oil level sensing apparatus of claim 7 wherein the layers of gold are approximately 1 micron in thickness and the Kovar is about 0.0015 inch thick.

9. An oil level sensing circuit for determining that the level of oil in an internal combustion engine is above or below a predetermined level comprising:

a mounting member securely mountable within an opening, defined by a wall of the internal combustion engine, at the level above which it is desired to maintain said oil within said internal combustion engine;

an electrically conducting output terminal member insulatively mounted within a hole, extending axially through said mounting member, said output terminal extending beyond both surfaces of the wall of said internal combustion engine and terminating with a spring type contact on that end which extends internally to the internal combustion engine;

a body of semiconductor material having a peak electrical resistivity of between 100 ohm-cm and 200 ohm-cm, said peak resistivity occurring at a temperature between 150° centigrade and 165° centigrade;

a cylindrical cup having a flange at its open end, constructed of a metal alloy having a thermal coefficient of conductivity closely matching that of the semiconductive material said cup being coated on both its inside and outside surface with a layer of gold;

said body of semiconductor material having a thickness of less than ten one-thousandths of an inch, and a cross sectional area of between 0.015 and 0.035 square inches;

a first conducting means, disposed upon the upper surface of said body of semiconductive material, comprising a first layer of nickel approximately 1 micron thick and a second layer of aluminum of between 6 and 12 microns thick, said first layer of nickel being joined to the upper surface of the second layer of aluminum which is joined to the upper surface of said body of semiconductive material;

a second conducting means, disposed upon the lower surface of said body of semiconductive material, comprising a first layer of nickel approximately 1 micron thick and a second layer of aluminum of between 6 and 12 microns thick, said first layer of nickel being joined to the lower surface of the second layer of aluminum which is joined to the lower surface of said body of semiconductive material;

said first layer of nickel of said second conducting means being joined to the layer of gold on the interior bottom surface of said cup by a solder means less than one-thousandth of an inch thick;

said cup and its attached semiconductor material being mounted upon said mounting member so as to completely enclose that end of said output terminal which terminates with the spring contact and cause said spring contact to make electrical connection with the first layer of nickel of said first conducting means;

a 12 volt D.C. power source having a first and second terminal, said first terminal being electrically connected to said mounting member;

an indicator light having a first and second terminal, said first terminal being electrically connected to said second terminal of said 12 D.C. volt power source, and said second terminal being electrically connected to said output terminal member;

a shield member mounted upon said mounting member and surrounding said cup so as to protect the cup from impact, said shield being so constructed as to permit the free flow of oil around said cup.

10. The oil level sensing circuit of claim 9 wherein the cup is made of the alloy Kovar.

11. The oil level sensing circuit of claim 10 wherein the solder means is enriched with gold and germanium.

12. The oil level sensing circuit of claim 11 wherein the layers of gold are approximately 1 micron in thickness and the Kovar is about 0.0015 inch thick.

* * * * *